United States Patent [19]

Pierce et al.

[11] 4,429,412
[45] Jan. 31, 1984

[54] X-RAY FILM MARKER

[76] Inventors: Larry L. Pierce; June Pierce, both of 4120 Vansant Rd., Douglasville, Ga. 30135

[21] Appl. No.: 291,780

[22] Filed: Aug. 10, 1981

[51] Int. Cl.³ ............................................. G03B 41/16
[52] U.S. Cl. .................................... 378/165; 378/182
[58] Field of Search ............... 378/165, 188, 181, 154, 378/186, 167; 206/455

[56] References Cited

U.S. PATENT DOCUMENTS

| | | |
|---|---|---|
| 966,696 | 8/1910 | Merrill . |
| 1,447,430 | 3/1923 | Richardson . |
| 1,735,883 | 11/1929 | Smith . |
| 1,860,389 | 5/1932 | Huebner . |
| 2,018,175 | 10/1935 | Knight ................................. 250/34 |
| 2,071,912 | 2/1937 | Auer .................................... 250/34 |
| 2,120,064 | 6/1938 | Buckley ............................... 250/34 |
| 2,172,528 | 9/1939 | Auer .................................... 250/67 |
| 2,257,933 | 10/1941 | Belknap ............................... 250/67 |
| 2,590,891 | 4/1952 | Reuter ................................ 378/188 |
| 2,796,525 | 6/1957 | Nordstrom ......................... 378/165 |
| 2,858,446 | 10/1958 | Parish ................................. 378/165 |
| 3,407,507 | 10/1968 | Brubaker ............................ 33/179 |
| 3,435,511 | 4/1969 | Cooper et al. ...................... 29/476 |
| 3,518,428 | 6/1970 | Ring .................................... 250/67 |
| 3,591,804 | 7/1971 | Minadan .............................. 250/67 |
| 3,600,577 | 8/1971 | Lovison ............................. 378/165 |
| 3,619,611 | 11/1971 | Hall .................................... 250/67 |
| 3,668,394 | 6/1972 | Panzer ................................. 250/67 |
| 3,836,783 | 9/1974 | Stievenart et al. ................. 250/481 |
| 3,964,107 | 6/1976 | Stievenart et al. ................. 250/468 |
| 3,976,887 | 8/1976 | Holzermer ......................... 378/181 |
| 4,035,653 | 7/1977 | Karasko ............................. 250/475 |
| 4,039,841 | 8/1977 | Leighley . |
| 4,112,304 | 9/1978 | Huettner et al. ................... 250/476 |
| 4,114,044 | 9/1978 | Chiulli ................................. 250/468 |
| 4,132,897 | 1/1979 | Ohlson et al. ...................... 378/167 |
| 4,194,625 | 3/1980 | Stievenart et al. ................. 378/165 |

FOREIGN PATENT DOCUMENTS 2543625 11/1976 Fed. Rep. of Germany ...... 378/165

OTHER PUBLICATIONS

X-Ray Film Marker Sets.
Knight X-Ray Markers, Storage Cases, Lead Letters & Figures, H. W. Knight & Son, Inc., Seneca Falls, N.Y. 13148, Form 2442 5M 6-60.

*Primary Examiner*—Alfred E. Smith
*Assistant Examiner*—T. N. Grigsby
*Attorney, Agent, or Firm*—George M. Thomas

[57] ABSTRACT

A film support defines an x-ray permeable path and indicia such as the letters L and R are carried by an indicia support and the indicia support is movably mounted to the film support and overlies the x-ray path. The indicia are opaque to x-rays and the indicia support is arranged to alternately locate one indicia in the x-ray path and the other indicia out of the x-ray path so that when film is placed in the film support and is exposed to x-rays and later is developed, the film will have the image of one of the indicia imposed thereon.

7 Claims, 11 Drawing Figures

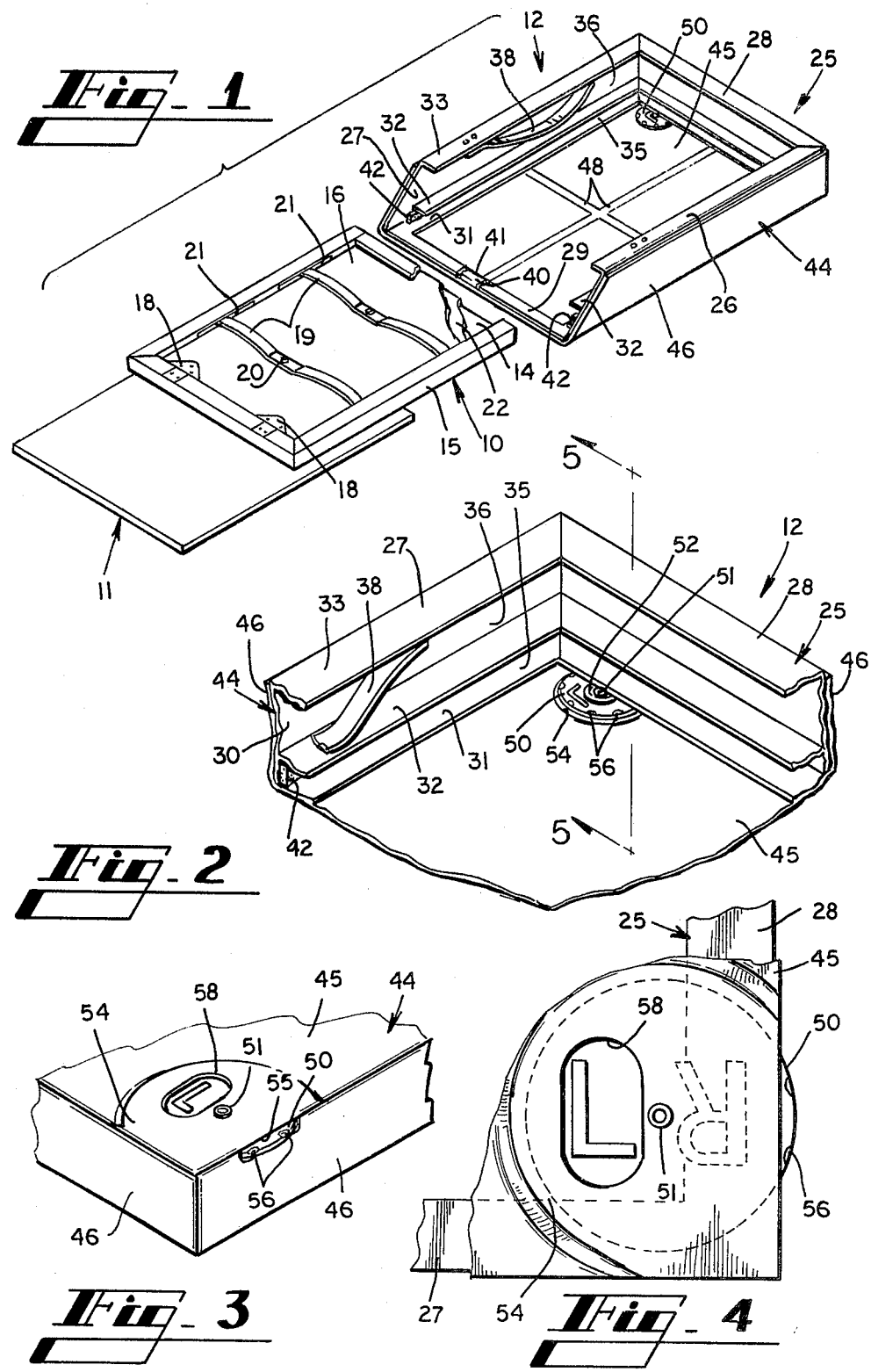

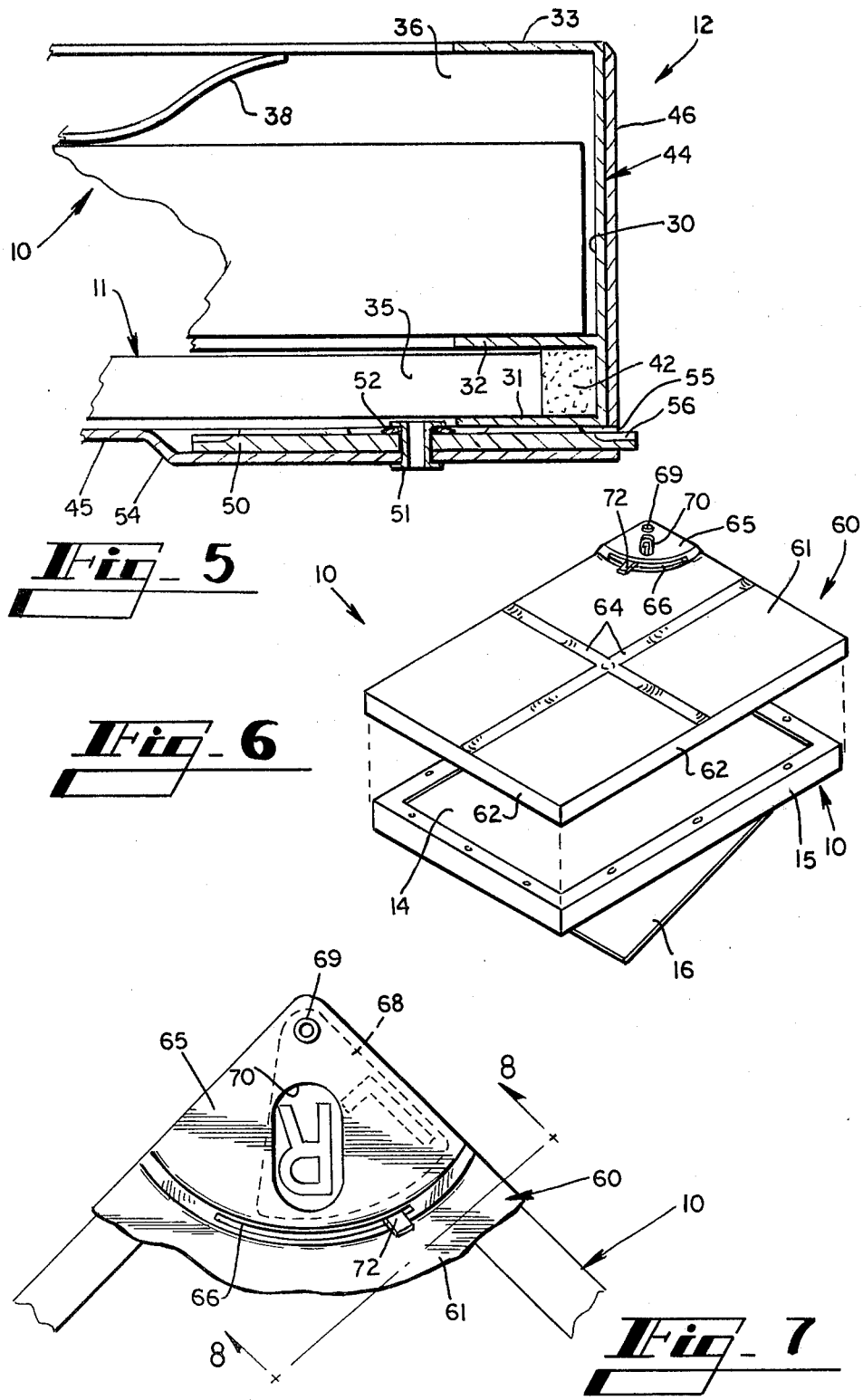

X-RAY FILM MARKER

BACKGROUND OF THE INVENTION

This invention relates to x-ray film cassettes and cassette holders and covers of the type to be used with x-ray equipment, wherein film is encased in a film cassette and the film and the cassette are exposed to x-rays, as when forming images of the skeletal portions of the human body, etc. More particularly, the invention relates to the marking of x-ray film with the letters L or R as the film is exposed with x-rays so as to indicate that the image shown on the film is of the left or right portion of the body.

When x-ray images are made of the human body, it is highly desirable to mark the x-ray film with the letters L or R so that when the physician inspects the developed x-ray film, the physician is certain as to which limb or portion of the body is being observed. In the past, x-ray impermeable letters have been physically attached to film cassettes by applying adhesive tape about lead letters and attaching the adhesive to the exterior surface of the x-ray permeable sheet of the cassette to fasten the letters to the cassette. While this procedure causes the R or L indicia to be imposed on the x-ray film, the procedure is not always convenient or successful. For example, the R and L letters are not always applied to the same portion of the film cassette and therefore the images left by the letters on the film appear in random locations on the film. In some instances, the lead letters are dislodged from the cassette before the film is exposed, so that there is no indicia image on the exposed film. In some instances the lead letters are dislodged and moved toward the center of the cassette during the procedure of making the x-ray image, and the images of the indicia appears near the center of the developed film. In other instances the x-ray technician may simply forget to apply the L and R letters to the cassette.

SUMMARY OF THE INVENTION

Briefly described, the present invention comprises an x-ray film marker for applying indicia such as the letters L and R to exposed and developed film of x-ray equipment, wherein the indicia are mounted in an indicia support, and the indicia support is movably mounted to a film support. The indicia support is constructed so as to locate one of the indicia in the path of the x-rays and to locate the other indicia out of the path of the x-rays, so that when the film is exposed to the x-rays the image of only one of the indicia will be imposed on the film. The film support can comprise, for example, a film cassette, a film cassette holder, or a cover for a film cassette. The indicia support can comprise, for example, a wheel rotatably mounted to the film support adjacent an edge portion thereof with the L indicia on one side of the pivot and the R indicia on the other side of the pivot, so that when one letter is rotated to a position adjacent the central portion of the film support and in the path of the x-rays, the other letter is located out of the path of the x-rays.

Thus, it is an object of this invention to provide an x-ray film marker which comprises part of a film support and which can be expediently adjusted to position appropriate indicia, such as the letters L or R, in the path of the x-rays directed toward the film as the film is being exposed to x-rays.

Another object of this invention is to provide a film marker for use with x-ray equipment and the like which imposes the image of variable indicia on the film at a predetermined location of the film, and which is inexpensive to construct and to maintain, and which is convenient and reliable in use.

Other objects, features and advantages of the present invention will become apparent upon reading the following specification, when taken in conjunction with the accompanying drawings.

BRIEF DESCRIPTION OF THE DRAWINGS

FIG. 1 is an exploded perspective illustration of a prior art x-ray film cassette, a prior art grid sheet, and of the novel cassette and grid holder.

FIG. 2 is a detail perspective illustration of a portion of the cassette and grid holder of FIG. 1, showing the indicia support wheel.

FIG. 3 is a detail perspective illustration of the cassette and grid holder, showing the surfaces opposite to those shown in FIG. 2.

FIG. 4 is a detail top plan view of the corner portion of the cassette and grid holder of FIGS. 1-3, showing the indicia support wheel in broken lines.

FIG. 5 is a side cross-sectional view, taken along lines 5—5 of FIG. 2, showing the indicia support wheel.

FIG. 6 is an exploded perspective illustration of another embodiment of the invention, of a cassette cover and its indicia assembly.

FIG. 7 is a detail top plan view of a portion of the indicia cover of FIG. 6 and of the indicia support assembly.

DETAILED DESCRIPTION

Figure 8:
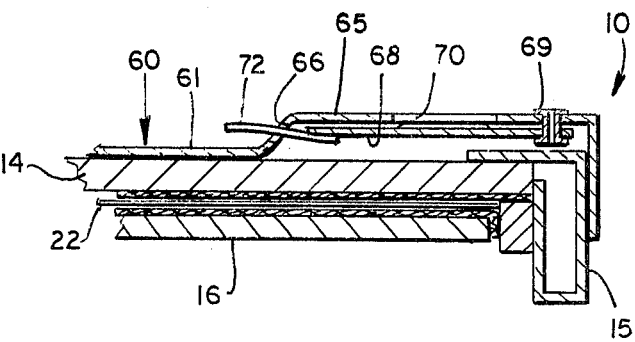
FIG. 8 is a detail cross-sectional view of the cassette and cover taken along lines 8—8 of FIG. 7.

Referring now in more detail to the drawings, in which like numerals indicate like parts throughout the several views, FIG. 1 illustrates an x-ray film cassette 10, a grid plate 11, and an x-ray cassette and grid plate holder 12. Film cassette 10 is of conventional construction and includes a flat x-ray permeable support plate 14, a rectangular border x-ray impermeable frame 15 and a substantially flat x-ray impermeable cover plate or door 16 which is connected by hinges 18 to frame 15. Pivotable leaf spring locks 19 are connected by pivot pins 20 to door 16 and are rotatable so that their end portions can engage slots 21 of frame 15 to hold door 16 in flat abutment with respect to support plate 14. Unexposed x-ray film 22 is placed between the support plate 14 and door 16, and the door is closed and locked against the film, to shield the film from light whereupon the entire film cassette 10 can be inserted in an x-ray machine with the x-ray permeable support plate 14 facing the patient and the x-ray equipment for receiving the image of the patient. This is conventional in the art.

Grid plate 11 comprises a laminated sheet of layers of lead strips and x-ray permeable material (not shown), and the grid plate is used in combination with the film cassette when x-ray images are to be taken of large body portions, etc., so as to filter the rays transmitted to the film. This is also conventional in the art.

X-ray cassette and grid holder 12 comprises a rectangular border frame 25 that comprises opposite parallel side walls 26 and 27, a back wall 28 and a front support strut 29. Back wall 28 extends between and is connected at its ends to the end portions of side walls 26 and 27, while support strut extends between and is connected at its ends to the other end portions of side walls 26 and 27. As illustrated in FIGS. 1, 2 and 5, the side walls and end wall of the rectangular border frame of cassette and grid holer 12 are formed from identical extruded stock which includes a base web 30, inner flange 31, intermediate flange 32, and outer flange 33. The flanges 31–33 form slots 35 and 36 therebetween, with slot 35 being of smaller height than slot 36. Slot 35 is of a height suitable for receiving in a snug fit the grid plate 11 while slot 36 is of a size suitable for receiving film cassette 10 therein. Slot 36 is larger than the thickness of the film cassette, and leaf springs 38 are located in slot 36 and are attached to the inner surface of outer flange 33 and project toward intermediate flange 32, so as to make frictional contact with a cassette 10 and to bias the film cassette toward intermediate flange 32 and to place the film cassette in close juxtaposition with respect to grid plate 11.

Leaf spring 40 (FIG. 1) is mounted to strut 29 at the front of cassette and grid holder 12 and its free end 41 protrudes up in the path of movement of the grid plate 11 when the grid plate is slid into the cassette and grid holer 12. When the trailing edge of the grid plate passes beyond the free edge portion 41 of leaf spring 40, the leaf spring will protrude up into the plane of the grid plate 11 and prevent the grid plate from inadvertently falling out of the cassette and grid holder. When the grid plate is to be removed from the cassette and grid holder 12, the leaf spring 40 is depressed against strut 29 so as to move out of the way of the grid plate as it is withdrawn from the cassette and grid holder 12. A strip of flocked material or other soft material 42 is adhesively mounted to base web 30 in each slot 35 between inner flange 31 and intermediate flange 32 so as to apply friction to the side edges of the grid plate 11, and to hold the grid plate in a static position within the cassette and grid holder 12.

A cover sheet 44 is secured to rectangular border frame 25 of cassette and grid holder 12 and comprises the substantially flat panel 45 that extends about and between the inner flanges 31 of the side walls 26 and 27 and end wall 28 and overlies the strut 29, and the border panels 46 which are adhesively secured to the outer surfaces of the base webs 30 of the side walls 26 and 27 and end wall 28. The cover sheet is vacuum formed and is extended about the rectangular border frame 25 and is secured thereto with adhesive. A centering mark or scribe lines 48 (FIG. 1) are vacuum formed centrally of the cover sheet 44 so as to locate the center of the cassette and grid holder in the x-ray equipment. The scribe lines are formed by a pair of crossing linear recesses which are formed in the panel 45 of the cover sheet 44.

When the film cassette 10 and grid plate 11 are inserted in the cassette and grid holder 12, the rectangular border frame 25 of the cassette and grid holder 12 and the rectangular border frame 15 of the film cassette 10 overlie each other and form an x-ray permeable path through the cover sheet 44 of the cassette and grid holder 12 and through the x-ray permeable support plate 14 of the film cassette 10 to the film 22 inside the film cassette.

Indicia support 50 is movably mounted to cassette and grid holder 12 in the panel 45 of cover sheet 44 at the intersection of end wall 28 with side wall 27. In the embodiment illustrated in FIGS. 1–5, indicia support 50 comprises a rotatable wheel that is pivotally connected to the panel 45 by means of brad 51 extending centrally through the support wheel 50 and through the panel 45. Brad 51 functions as a pivot pin, and conical washer 52 (FIG. 5) extends about brad 51 and bears against support wheel 50, so as to urge the support wheel in sliding frictional contact with panel 45.

Panel 45 is formed with an approximately circular protrusion 54 which is slightly larger in diameter than the diameter of support wheel 50, and the portion of the protrusion adjacent end wall 28 of rectangular border frame 25 defines a slot 55 therethrough (FIGS. 3 and 5) and an edge portion of the support wheel 50 protrudes through the slot. With this arrangement, a portion of the support wheel 50 overlies the end wall 28 of the rectangular border frame 25 while the other portion of the support wheel 50 extends out into the x-ray permeable path of the cassette and grid holder 12.

Indicia support wheel 50 comprises the letters R and L that are formed from ¾" flat faced lead material, with transparent plastic sheet material located on opposite sides of the letters. The indicia support wheel 50 is formed by vacuum forming one plastic sheet of material to one surface of the letters, then adhesively bonding the letters and the vacuum formed sheet to a flat sheet of the same type plastic material. Finger notches 56 are formed in the periphery of the indicia support wheel 50. An opening or window 58 (FIGS. 3 and 4) is formed in the panel 45 of cover sheet 44 over indicia support wheel 50 in the x-ray permeable path, and the letters R or L are arranged to register with the opening, while the opposite letter R or L is out of sight and is located out of the x-ray permeable path of the cassette and grid holder 12, over the x-ray impermeable end wall 28 of the border frame 25. With this arrangement, when the film cassette 10 is loaded with unexposed film 22 and the film cassette is inserted in the cassette and grid holder 12 the operator will rotate the indicia support wheel 50 to visually expose either the L or the R to the window 58 which is in the x-ray permeable path of the assembly, to indicate what portion of the body that is being x-rayed, and when the film is exposed to the x-rays, the image of the letter visually exposed in the window 58 will be imposed on the film, and when the film is later developed, the image of the letter will be carried with the developed film so as to positively indicate that the image on the film is either the left or right portion of the body.

As illustrated in FIGS. 6, 7 and 8, wherein another embodiment of the invention is illustrated, the conventional x-ray film cassette 10 includes a cover 60 positioned thereon, with the cover 60 comprising a panel 61 and border panels 62. The panel 61 is placed in juxtaposition with the x-ray permeable support plate 14 of the film cassette 10, while the border panels 62 extend about the edges of the frame 15 of the cassette. The cover 60 preferably is vacuum formed, and is subsequently applied to the cassette 10 with an adhesive. Scribe lines 64 are also vacuum formed in the cover 60 so as to enable the operator to conveniently locate the center of the assembly in the x-ray equipment.

In the embodiment illustrated in FIGS. 6, 7 and 8, one corner portion of the cover 60 is formed with a protrusion 65 that is approximately fan-shaped and includes a slot 66 at its arcutate edge. A fan-shaped indicia support 68 is located in protrusion 65, and brad 69 pivotally connects the indicia support 68 at its apex to the corner of the protrusion. Window opening 70 is formed in panel 61 over indicia support 68. Tab 72 is connected to indicia support 68 and protrudes through arcuate slot 66. The lead letters L and R are mounted to the indicia support 68. When the tab 72 is moved to one end of slot 66, it moves the indicia support 68 about brad 69 which functions as a pivot pin, so that either the letter L or R is exposed through the window opening 70 while the opposite letter L or R is in overlying relationship with respect to the frame 15 of the film cassette. With this arrangement, the letter that is visually exposed through the opening 70 will be located in the x-ray permeable path of the cover 60 while the other letter will be out of sight and will be out of the x-ray permeable path.

Figure 9:
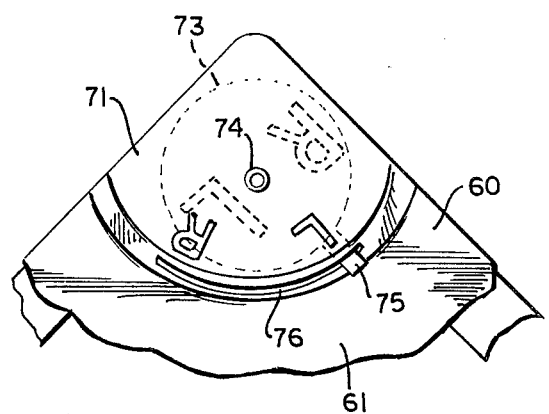
FIG. 9 is a detail top plan view of another embodiment of the invention, showing a portion of a cassette cover and a modified indicia support assembly.

As illustrated in FIG. 9, the cover 60 for the film cassette 10 can include a modified indicia support assembly which includes a protrusion 71 at the corner of the panel 61, and indicia support wheel 73 pivotally connected at its center to the protrusion 71 by brad 74. The lead L and R letters carried by the indicia support wheel 72 are never visually exposed to the operator and remain under the solid panel 61. The tab 75 is connected to the indicia support wheel 50 and protrudes through the arcuate slot 76 so that the operator can move the tab along the length of the slot and therefore rotate the indicia support wheel 72 through approximately 90 degrees. This places either the letter L or the letter R in the x-ray permeable path of the film cassette while the other letter is in the border of the film cassette and out of the path of the x-ray. Additional letters L and R are painted or otherwise applied to the exterior surface of the panel 61 adjacent the slot 76, so that when the tab 75 is located adjacent the painted letter L, the lead letter L carried by the indicia support wheel 72 will be positioned in the x-ray permeable path of the assembly while the lead letter R will be in the border. When the tab 75 is moved from one end to the other end of the slot so that it is adjacent the painted letter R, the indicia support wheel 72 is rotated so that the letter L is moved out of the x-ray permeable path into the border of the film cassette while the letter R is rotated out from the border into the x-ray permeable path.

The cover sheet 44 of the cassette and grid holder 12 of FIGS. 1-5 and the cover 60 of the film cassette 10 of FIGS. 6-9 are formed from Kydex plastic in a vacuum forming machine, by heating the plastic to approximately 400° F. and vacuum forming the sheet material about a mold in the conventional manner. The Kydex is subsequently removed from the vacuum former and then applied to the rectangular border frame 25 of the cassette and grid holder 12 (FIGS. 1-5) or applied to the frame 15 of the film cassette (FIGS. 6-9) with adhesive bonding the cover sheet to the frame elements. The Kydex plastic sheet material is available in a multiple number of colors, and the colors of the cassette and grid holder 12 or of the cover for the film cassette can be chosen to match different functions or different areas of a hospital, etc.

Figure 10:
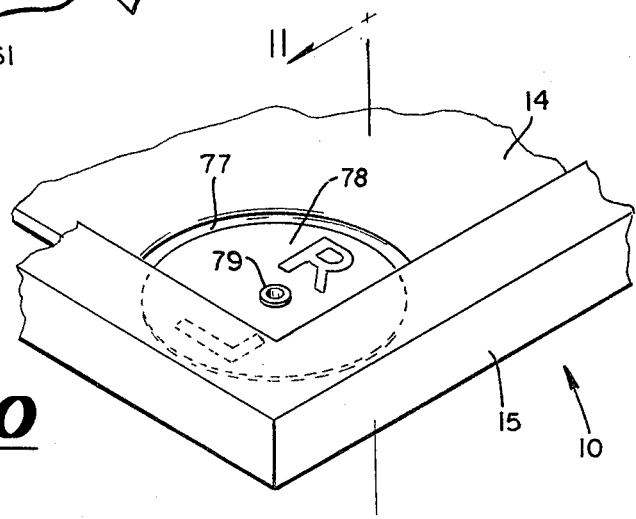
FIG. 10 is a detail perspective illustration of another embodiment of the invention, of a portion of a film cassette and an indicia support assembly included therein.
Figure 11:
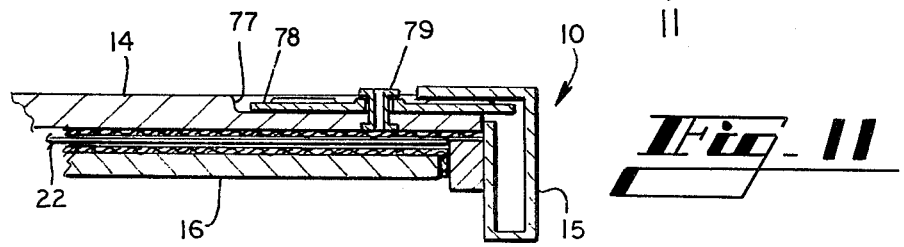
FIG. 11 is a side cross-sectional view of a portion of the film cassette and indicia support assembly of FIG. 10, taken along lines 11—11 of FIG. 10.

As illustrated in FIGS. 10 and 11, the indicia support can be combined directly with the film cassette. For example, the x-ray permeable support plate 14 of film cassette 10 includes a circular recess 77 at one corner thereof adjacent the frame 15. Circular indicia support wheel 78 is recevied in the recess 77 and the lead letters R and L are carried by the indicia support wheel. The indicia support wheel is connected by brad 79 to support plate 14 and the brad functions as a pivot pin, so that the wheel rotates within the recess 77, and one of the letters L or R will be located beneath the surface of the frame while the other letter will be moved out from the frame into the x-ray permeable path of the assembly.

It will be seen from the foregoing description that either the film cassette itself (FIG. 10) or the film cassette in combination with the cassette and grid holder 12 or in combination with the cover 60 function as a film support means that includes a frame that defines an x-ray permeable path therethrough, and the indicia support wheels 50, 72 or 78 or the fan-shaped indicia support 68 function as indicia support means that are movably mounted to the film support means and overlie the x-ray impermeable frame and the x-ray permeable path. When unexposed film is placed in the film support means and is exposed to x-rays and later is developed, the film will have the image of one of the x-ray impermeable indicia imposed thereon.

While this invention has been described in detail with particular reference to a preferred embodiment thereof, it will be understood that variations and modifications can be effected within the spirit and scope of the invention as described hereinbefore and as defined in the appended claims.

We claim:

1. An x-ray film marker comprising a film support means including a frame defining an x-ray permeable path, said film support means comprising a film cassette including a rectangular x-ray opaque border frame, a flat x-ray permeable support plate mounted in said border frame, an x-ray opaque door pivotably mounted to said border frame and normally positioned in parallel relationship with respect to said support plate whereby x-ray film is held between said door and said support plate in the x-ray permeable path, and indicia support means movably mounted to a corner of said border frame, at least two indicia carried by said indicia support means and spaced from one another, said indicia being opaque to x-rays, with the indicia support means movable to position one indicia in the x-ray path in front of the x-ray film and the other indicia in overlying relationship with the border frame whereby when unexposed film is placed in the film support means and is exposed to x-rays and later is developed, the film will have the image of one of the indicia imposed thereon.

2. An x-ray film marker comprising a film cassette holder including a rectangular border frame including opposite parallel side walls, a back wall and a front support strut extending between the side walls defining an x-ray permeable path, said side walls each defining a channel for slidably receiving therein an x-ray film cassette from the support strut toward said back wall, an x-ray permeable cover extending about said rectangular border frame, indicia support means movably mounted to said cassette holder and overlying said frame and said path, at least two indicia carried by said indicia support means and spaced from one another, said indicia being opaque to x-rays, and said indicia support means movably mounted to said cassette holder to position one indicia in overlying relationship with the rectangular border and the other indicia inwardly of the rectangular border whereby when unexposed film is placed in the film support means and is exposed to x- rays and later is developed, the film will have the image of one of the indicia imposed thereon.

3. The x-ray film marker of claim 2 and wherein said side walls of said border frame each further includes a second channel for slidably receiving a grid plate therein for juxtaposition with the film cassette, and means for releasably retaining said grid plate in said cassette holder.

4. An x-ray film marker comprising a film cassette including a rectangular x-ray opaque border frame defining an x-ray permeable path, a flat x-ray permeable support plate mounted to said border frame, an x-ray opaque door pivotably mounted to said border frame and normally positioned in parallel relationship with respect to said support plate whereby x-ray film is held between said door and said support plate in the x-ray permeable path, and a cassette cover extending from said border frame externally over said support plate, indicia support means movably mounted to said cassette cover and overlying said frame and said path, at least two indicia carried by said indicia support means and spaced from one another, said indicia being opaque to x-rays, said indicia support means being constructed and arranged to alternately locate one indicia in said path and the other indicia out of said path whereby when unexposed film is placed in the film support means and is exposed to x-rays and later is developed, the film will have the image of one of the indicia imposed thereon.

5. The x-ray film marker of claim 4 and wherein said cassette cover is vacuum formed and is adhesively applied to said cassette.

6. An x-ray film marker comprising a film support means including a frame defining an x-ray permeable path and indicia support means movably mounted to said film support means and overlying said frame and said path, at least two indicia carried by said indicia support means and spaced from one another, said indicia being opaque to x-rays, said indicia support means being constructed and arranged to alternately locate one indicia in said path and the other indicia out of said path said film support means and said indicia support means being constructed and arranged to visually expose the indicia located in said x-ray permeable path and to visually obscure the indicia located out of said x-ray permeable path whereby when unexposed film is placed in the film support means and is exposed to x-rays and later is developed, the film will have the image of one of the indicia imposed thereon.

7. An x-ray film marker comprising film support means for supporting film therein, indicia support means movably mounted to said film support means, at least two x-ray impermeable indicia carried by said indicia support means and spaced from one another, said indicia support means being constructed and arranged to alternately locate one indicia in overlying relationship with the film in the film support means and the other indicia away from the overlying relationship with the film, said film support means and said indicia support means being constructed and arranged to visually expose the indicia located in said x-ray permeable path and to visually obscure the indicia located out of said x-ray permeable path, whereby when unexposed film is placed in the film support means and is exposed to x-rays and later is developed, the film will have the image of one of the indicia imposed thereon.

* * * * *